(12) United States Patent
Kundu et al.

(10) Patent No.: US 7,787,896 B2
(45) Date of Patent: Aug. 31, 2010

(54) DISPATCH SERVICE ARCHITECTURE FRAMEWORK

(75) Inventors: Gorachand Kundu, Dallas, TX (US); Ravi Ayyasamy, Dallas, TX (US); Krishnakant Patel, Richardson, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 660 days.

(21) Appl. No.: 10/515,556

(22) PCT Filed: May 23, 2003

(86) PCT No.: PCT/US03/16386

§ 371 (c)(1), (2), (4) Date: Nov. 23, 2004

(87) PCT Pub. No.: WO03/101007

PCT Pub. Date: Dec. 4, 2003

(65) Prior Publication Data

US 2005/0239485 A1    Oct. 27, 2005

Related U.S. Application Data

(60) Provisional application No. 60/382,981, filed on May 24, 2002, provisional application No. 60/383,179, filed on May 24, 2002, provisional application No. 60/407,168, filed on Aug. 30, 2002.

(51) Int. Cl.
*H04B 7/00* (2006.01)

(52) U.S. Cl. .................... 455/518; 455/414.1

(58) Field of Classification Search ............ 455/553.1, 455/428, 439, 560, 518, 3.05, 426.1, 521, 455/519, 520, 414.1
See application file for complete search history.

(56) References Cited

U.S. PATENT DOCUMENTS

| | | |
|---|---|---|
| 5,711,011 A | 1/1998 | Urs et al. |
| 5,987,318 A | 11/1999 | Alperovich et al. |
| 5,987,331 A * | 11/1999 | Grube et al. ............. 455/509 |
| 6,021,326 A | 2/2000 | Nguyen |
| 6,138,011 A | 10/2000 | Sanders, III et al. |
| 6,304,558 B1 | 10/2001 | Mysore |

(Continued)

FOREIGN PATENT DOCUMENTS

JP    2003-92776    3/2003

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner*—Tu X Nguyen
(74) *Attorney, Agent, or Firm*—Gates & Cooper LLP

(57) ABSTRACT

Group voice services are provided in a wireless network, such as a cellular telephone network (104, 108, 116), by a dispatch gateway (102) that interfaces to the wireless network to provide the group voice services therein, wherein both the dispatch gateway and mobiles (120) that use the group voice services communicate with each other using cell setup and in-band signaling within the wireless network.

25 Claims, 8 Drawing Sheets

U.S. PATENT DOCUMENTS

| | | | |
|---|---|---|---|
| 6,411,815 | B1 | 6/2002 | Balasuriya |
| 6,477,366 | B1 | 11/2002 | Valentine et al. |
| 6,577,874 | B1 * | 6/2003 | Dailey ................ 455/521 |
| 6,661,878 | B1 | 12/2003 | Mirashrafi et al. |
| 7,099,291 | B2 | 8/2006 | Harris et al. |
| 2001/0005372 | A1 | 6/2001 | Cave et al. |
| 2002/0196781 | A1 | 12/2002 | Salovuori |
| 2003/0016632 | A1 | 1/2003 | Refai et al. |
| 2003/0078064 | A1 | 4/2003 | Chan |
| 2003/0148779 | A1 * | 8/2003 | Aravamudan et al. ....... 455/519 |
| 2003/0190888 | A1 | 10/2003 | Mangal et al. |
| 2004/0057449 | A1 | 3/2004 | Black |
| 2004/0259580 | A1 | 12/2004 | Florkey et al. |
| 2005/0202807 | A1 | 9/2005 | Ayyasamy et al. |
| 2005/0221819 | A1 | 10/2005 | Patel et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0019654 | A1 | 1/2006 | Farrill |
| 2006/0030347 | A1 | 2/2006 | Biswas |
| 2006/0189337 | A1 | 8/2006 | Farrill et al. |
| 2006/0234687 | A1 | 10/2006 | Patel et al. |
| 2007/0037597 | A1 | 2/2007 | Biswas et al. |
| 2007/0037598 | A1 | 2/2007 | Ayyasamy et al. |

FOREIGN PATENT DOCUMENTS

| | | |
|---|---|---|
| WO | WO 00/79825 | 12/2000 |
| WO | WO2005009006 | 12/2000 |
| WO | WO 03/101007 | 12/2003 |
| WO | WO2005112494 | 11/2005 |
| WO | WO2005115032 | 12/2005 |
| WO | WO2005117474 | 12/2005 |
| WO | WO2006105287 | 10/2006 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

SKYPE: "Skype". Web Archive—SKYPE, May 22, 2004, pp. 1-2. XP002345780 http://web.archive.org/web/20040522201727 http://www.skype.com.

Trachwell: "TrackWell Software and Tetra Iceland deliver value added services to Tetra users", TRACKWELL.COM, Oct. 2002, pp. 1-1. XP002345781 http://www.trackwell.com/news/news_twandtetra.htm.

* cited by examiner

DISPATCH SERVICE ARCHITECTURE FRAMEWORK

CROSS REFERENCE TO RELATED APPLICATIONS

This application claims the benefit under 35 U.S.C. Section 119(e) of the following co-pending and commonly-assigned U.S. provisional patent applications:

Ser. No. 60/382,981, filed on May 24, 2002, by Gorachand Kundu, Ravi Ayyasamy, and Kris Patel, entitled RADIO GATEWAY ARCHITECTURE FRAMEWORK;

Ser. No. 60/383,179, filed May 24, 2002, by Gorachand Kundu, Ravi Ayyasamy, and Kris Patel entitled DISPATCH SERVICE ARCHITECTURE FRAMEWORK; and Ser. No. 60/407,168, filed Aug. 30, 2002, by Gorachand Kundu, Ravi Ayyasamy, and Kris Patel, entitled DISPATCH SERVICE ARCHITECTURE FRAMEWORK;

all of which are incorporated by reference herein.

BACKGROUND OF THE INVENTION

1. Field of the Invention

This invention relates in general to wireless communications systems, and more specifically, to a dispatch service providing "push-to-talk" service in a cellular telephone system.

2. Description of Related Art

Group-based dispatch services (two-way half-duplex voice calls within a group also known as "Push-to-Talk" or PTT) have enormous revenue earnings potential for wireless networks, such as cellular networks and personal communications systems (PCS) networks. Corporate subscribers primarily use such services for coordinating field people or fleet users from a central location.

Currently, there are two major approaches employed in providing dispatch services such as PTT in wireless networks. One approach requires the installation of a dedicated private network, parallel to the wireless network, to support dispatch services. Nextel™ uses such a system, based on a solution developed by Motorola™ known as iDEN™. However, a dedicated private network is costly to install and maintain employed by a few public wireless carriers, Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless networks based on existing standards, such as GSM (Global System for Mobile Communications), CDMA (Code Division Multiple Access), etc. Even for the newer standards, solutions based on VoIP have serious drawbacks as explained below.

1. Call Setup: VoIP based solutions suffer from slower call setup, since this is a serial process. For example, for a CDMA PTT solution, call setup involves a CDMA data channel setup, followed by a PTT setup with SIP (Session Initiation Protocol) signaling. There is a need, instead, for parallel call setup exploiting existing cellular solutions.

2. Maximum Information Throughput Rate: VoIP solutions result in significant overhead to carry voice over data channels resulting in significantly reduced net information throughput rate.

3. Impact of Packet Loss: VoIP solutions employ voice packet aggregation that results in increased susceptibility to packet losses.

4. Voice Quality: VoIP solutions employ low bit rate voice coders (4 kbps). There is a need, instead, for an approach that complies with higher rate voice coders, such as EVRC (Enhanced Variable Rate Codec), resulting in better voice quality.

5. Impact to Mobile Handsets: VoIP solutions require significant modifications to the mobile handset. There is a need, instead, for solutions that require only minimal upgrades to the handset.

In summary, there is a need in the art for dispatch services solutions that comply with existing and emerging wireless standards and provides superior user experience with faster call setup, better voice quality, and improved information rate compared to other competing solution.

The present invention aims to satisfy these needs by providing group-based dispatch services that use existing networks with minimal changes. The dispatch service architecture framework of the present invention allows the wireless network to provide an instantaneous voice messaging service wherein a group of users can exchange voice messages at any time from anywhere within the network. This powerful, innovative and cost-effective dispatch service architecture framework will differentiate the service offerings by present wireless networks and provide them edge over their competitors.

SUMMARY OF THE INVENTION

To overcome the limitations in the prior art described above, and to overcome other limitations that will become apparent upon reading and understanding the present specification, the present invention discloses an apparatus for providing group voice services in a wireless network, comprising a dispatch gateway that interfaces to the wireless network to provide the group voice services therein, wherein both the dispatch gateway and mobiles that use the group voice services communicate with each other using call setup and in-band signaling within the wireless network.

BRIEF DESCRIPTION OF THE DRAWINGS

Referring now to the drawings in which like reference numbers represent corresponding parts throughout.

DETAILED DESCRIPTION OF THE INVENTION

Figure 1:
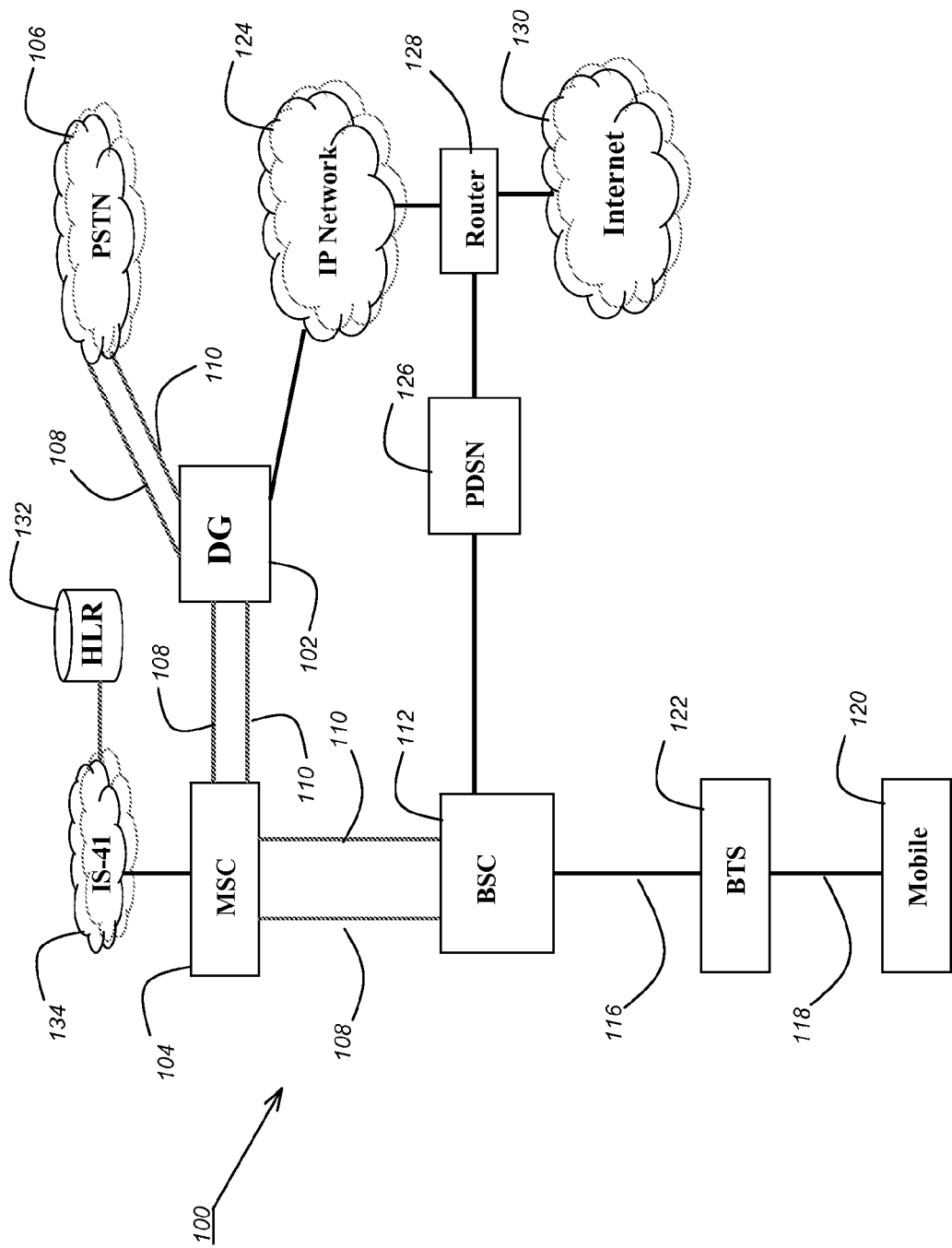
FIG. 1 is a block diagram that illustrates an exemplary embodiment of the dispatch services architecture framework according to a preferred embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Definitions

This section provides a brief definition of the functional components. The components are described with respect to their base functionality and are not specific to their hosting platform.

Dispatch Service (DS): The dispatch service is defined as an instant two-way half-duplex voice messaging within a group of users. Any user within the dispatch service network can join any group (provided he/she has privilege) and talk to the group members from anywhere in the network. It is also called as Push To Talk (PTT) service.

Dispatch Gateway (DG): The dispatch gateway combines both bearer and signaling functions of the group voice service. Physically, it is a single node or system control point that enables a carrier to introduce group voice service into its network. It does not have any interface to radio access technology. The main purpose of this system is to support all group call signaling including SS7-ISUP (Signaling System 7-Integrated Services Digital Network User Part) signaling, call processing and voice frame duplication functions. For PTT calls spanning across multiple DGs, it uses packet technology. It uses SIP (Session Initiation Protocol) for signaling and RTP/UDP/IP (Real-time Transport Protocol/User Datagram Protocol/Internet Protocol) for voice transport for inter-DG PTT calls.

Registration and Presence Application (RPA): The registration and presence application enables group voice service users to track the presence of fellow members in the network on their mobile handsets. When a user powers on/off his mobile, his presence is updated in fellow members' handsets within the group.

Tandem Free Operation (TFO): Tandem free operation refers to an in-band signaling standard through PCM (pulse code modulation) frames to bypass voice coders for mobile-to-mobile calls. TFO improves MOS (mean-opinion-score) for mobile-mobile calls, as they don't require unnecessary vocoder conversion at egress (e.g., wireless codec to PCM and ingress points (e.g., PCM to wireless codec).

Architectural Overview

In the present invention, group-based dispatch services are provided through existing circuit-based wireless network infrastructures. The group-based dispatch services interface into the wireless network in order to provide group call signaling and voice frame duplication. Consequently, this present invention does not require any change in the existing wireless network infrastructure, and only requires minor application level changes in mobile handsets.

This application describes the dispatch service architecture framework in more detail below. It discloses a high-level network topology that includes a dispatch gateway and the interfaces required for providing the dispatch services. It also shows the call flows for group calls made within the network.

Network Architecture

FIG. 1 is a block diagram that illustrates an exemplary embodiment of the dispatch services architecture framework according to a preferred embodiment of the present invention.

Within the network 100, a DG (dispatch Gateway) 102 communicates with a MSC (Mobile Switching Center) 104 and PSTN (Public Switched Telephone Network) 106 using SS7-ISUP/WIN/CAMEL (Signaling System 7-Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM or TFO voice frames. Support for TFO in this path 110 is negotiated between a BSC (Base Station Controller) 112 and the DG 102 for each originating and terminating leg of a group call. The use of TFO ensures high voice quality (as voice codec conversion is avoided) between mobile-to-mobile calls. Using TFO, the network can achieve higher MOS scores for PTT calls.

When a subscriber originates a group call the MOS 104 routes the call to the DG 102. The MSC 104 also requests the BSC 112 via 116 to establish a radio traffic path 118 with the mobile 120 via the BTS (Base Transceiver Station) 122 (as it does for a normal cellular call). At this time, the BSC 112 tries to negotiate TFO (if it is supported) on a TDM link with the far end (m this case, the DG 102).

At the same time (after the MSC 104 terminates the group call request to the DG 102), the DG 102 identifies the terminating group users and their MS-ISDN (Mobile Station ISDN Number) numbers. It sends a ISUP call origination request for each terminating mobile 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the DG 102 begins a negotiation with the far end in this case, the terminating BSC 112) for each terminating leg to a mobile 120.

Once bearer paths 110 are established for originating and terminating legs for a group call, the DG 102 switches (or duplicates) voice frames from the originating mobile 120 to all terminating mobiles 120.

The DG 102 may use an IP network 124 or the Internet/Intranet 130 for two different purposes. The IP network 124 or the Internet/Intranet 130 can be used in a toll bypass mode where two DGs 102 can exchange voice traffic bypassing the PSTN 106. However, each DG 102 is responsible for terminating traffic to its closest MSC 104. In this case, the IP network 124 or the Internet/Intranet 130 is used as a backbone transport of voice traffic between two DGs 102.

The IP network 124 or the Internet/Intranet 130 can also be used for a registration and presence application. Since the MSC 104 will not direct a registration request from a mobile 120 to the DG 102 (because it would require changes in the MSC 104), the latter doesn't have any information of the registered mobiles 120. To circumvent this issue, a registration and presence application runs over an IP stack in the mobile 120. After the mobile 120 registers for a data interface (i.e., obtaining an IP address) with the PDSN 126, the registration and presence application in the mobile 120 registers with the DG 102 using its IP address. The DG 102 also uses this IP interface to update the presence information of other group members to a mobile 120. There is also provision to use SMS (Short Message Service) transport to carry presence messages if an operator chooses to use SMS over a data channel.

During roaming, a Home Location Register (TTR) 132 can be accessed via the MSC 104 and an IS-41 link 134. The HLR 132 can be used to track the presence of members of a group within the network and updates the mobiles 120 for those members with the network availability of other members of the group. This is described in mote detail later in this document.

Protocol Stacks

Figure 2:
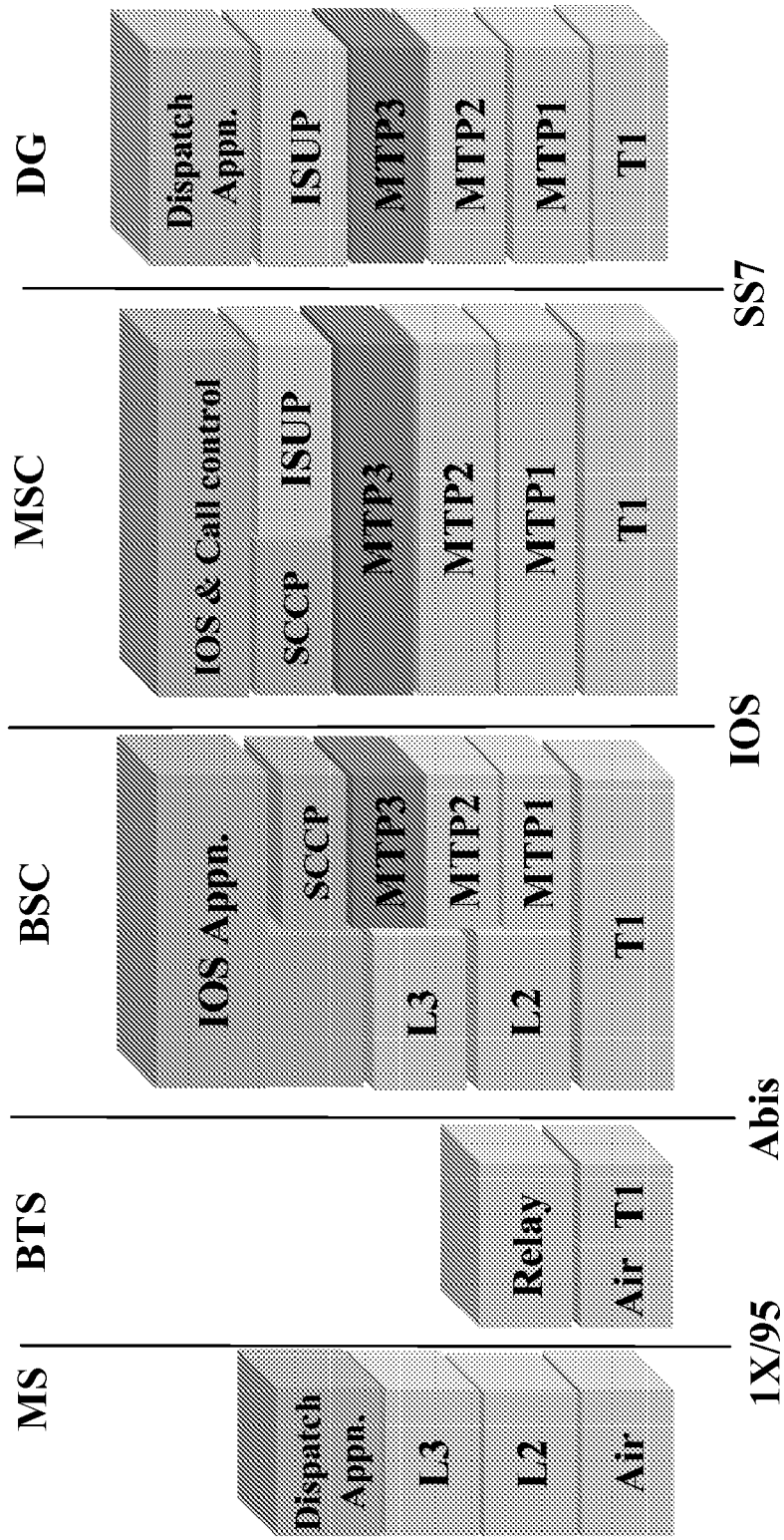
FIG. 2 is a block diagram that illustrates the protocol stacks for the dispatch call control plane services according to a preferred embodiment of the present invention.

FIG. 2 is a block diagram that illustrates the protocol stacks for the dispatch call control plane services according to a preferred embodiment of the present invention. The mobile (MS) 120 includes a dispatch application, as well as modules for radio frequency (Air), layer 2 (L2) and layer 3 (L3) protocols. The BTS 116 includes a relay application, as well as modules for Air and T1 protocols. The BSC 112 includes an IOS application, as well as modules for T1, L2 and L3 protocols, and various SS7 protocols, such as MTP-1 (Message Transfer Part Level 1), MTP-2 (Message Transfer Part Level 2), MTP-3 (Message Transfer Part Level 3) and SCCP (Signaling Connection Control Part) protocols. The MSC 104 includes an IOS and call control application, as well as modules for the T1 protocol and various SS7 protocols, such as the MTP-1, MTP-2, MTP-3, SCCP and ISUP (Integrated Services Digital Network User Part) protocols. The DG 102 includes a dispatch application, as well as modules for the T1 protocol and various SS7 protocols, such as MIT-1, MTP-2, MTP-3 and ISUP protocols.

The mobile (MS) 120 interfaces with the BTS 116 with any of the supported interfaces, identified as 1X/95. The interface between the BTS 116 and BSC 112 is based on the Abis standard. The interface between the BSC 112 and the MSC 104 is based on the IOS standard. However, the DG 102 interfaces using standard SS7/ISUP signaling with the MSC 104.

As noted above, the dispatch application resides both in the mobile 120 and DG 102. The rest of the elements in the network such as the BTS 122, BSC 112 and MSC 104, are transparent Subsequent to establishing a PTT session, the DG 102 interacts with the mobile 120 through DTMF signaling.

Figure 3:
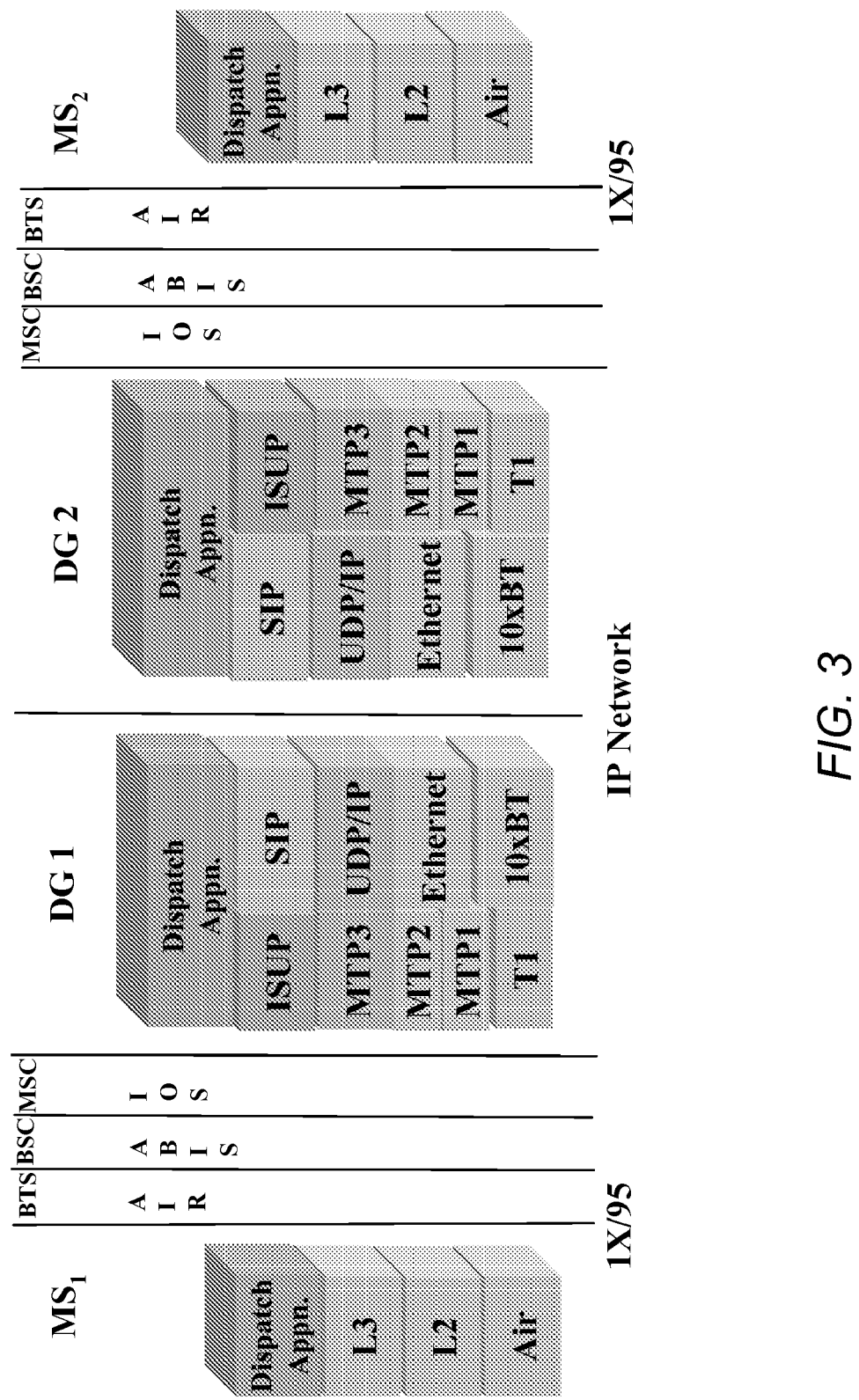
FIG. 3 is a block diagram that illustrates the protocol stacks for the inter-DG group call signaling according to a preferred embodiment of the present invention.

FIG. 3 is a block diagram that illustrates the protocol stacks for the inter-DG group call signaling according to a preferred embodiment of the present invention. In addition to the protocols and interfaces noted in FIG. 2, these protocol stacks include modules for UDP/IP (User Datagram Protocol/Internet Protocol), Ethernet and 10xBT (1000/100/10 Base-T) protocols. The DG 102 uses extended SIP (Session Initiation Protocol) for setting the group call with the other DG 102, and the inter-DG signaling is performed over the managed IP network 124.

Figure 4:
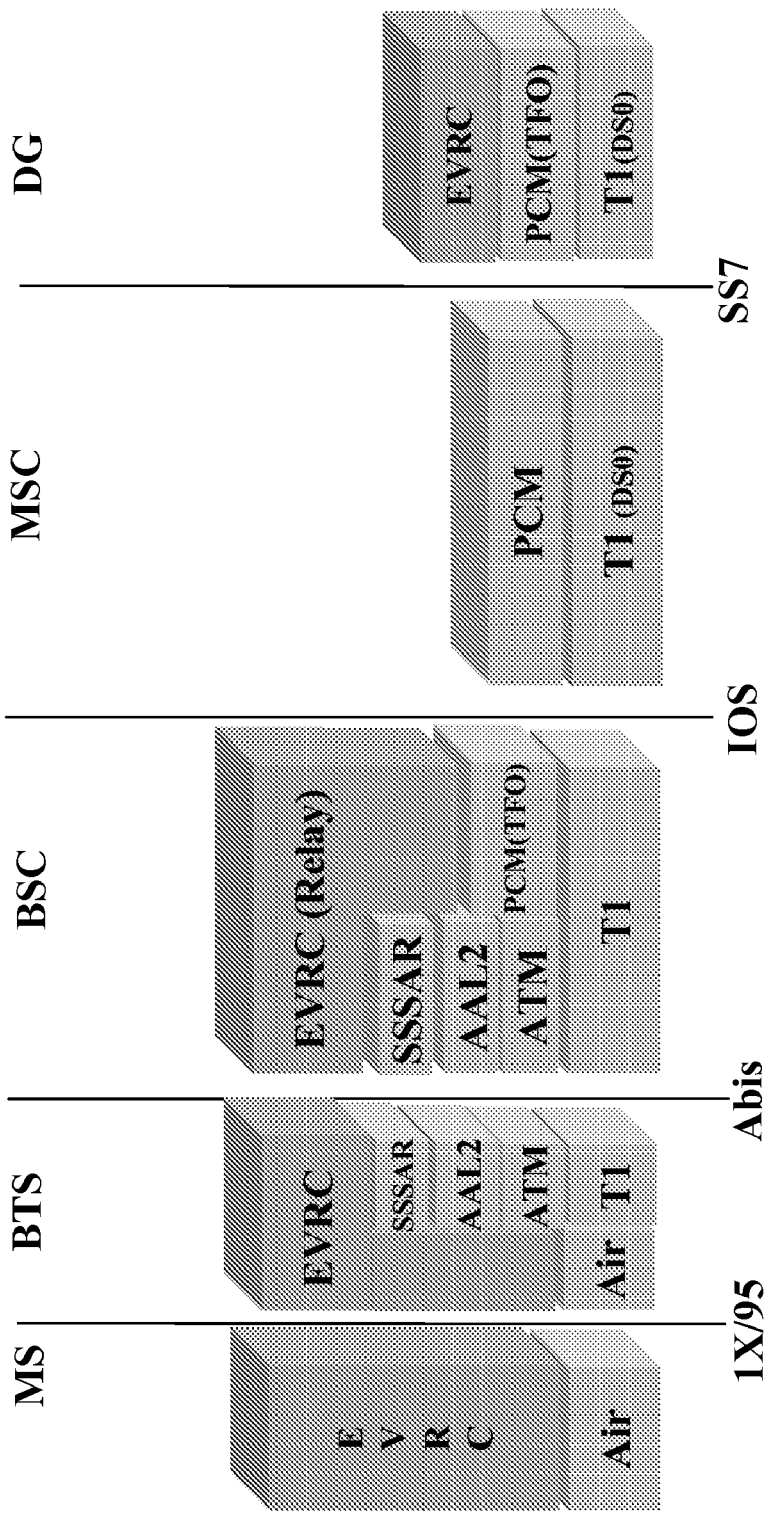
FIG. 4 is a block diagram that illustrates the protocol stacks for the bearer plane for a dispatch call from the mobile to the dispatch gateway according to a preferred embodiment of the present invention.

FIG. 4 is a block diagram that illustrates the protocol stacks for the bearer plane for a dispatch call from the mobile 120 to the DG 102 according to a preferred embodiment of the present invention.

The mobile (MS) 120 includes modules for EVRC (Enhanced Variable Rate Codec) and Air protocols. The BTS 116 includes modules for EVRC, Air, ATM (Asynchronous Transfer Mode), AAL2 (ATM Adaptation Layer 2) and SSSAR (Specific Segmentation and Reassembly) protocols. The BSC 112 includes modules for EVRC Relay, T1, ATM, AAU2, SSSAR and PCM (TFO) protocols. The MSC 104 includes modules for T1 and PCM (TFO) protocols. The DG 102 includes modules for EVRC Relay, T1 and PCM (TFO) protocols.

For intra-DG call legs, EVRC frames will travel in the same way from the DG 102 to the mobile 120. However, for inter-DG call legs, voice frames are carried over RTP (Real-time Transport Protocol)/UDP/IP between DGs 102.

Functional Blocks in the Dispatch Gateway

Figure 5:
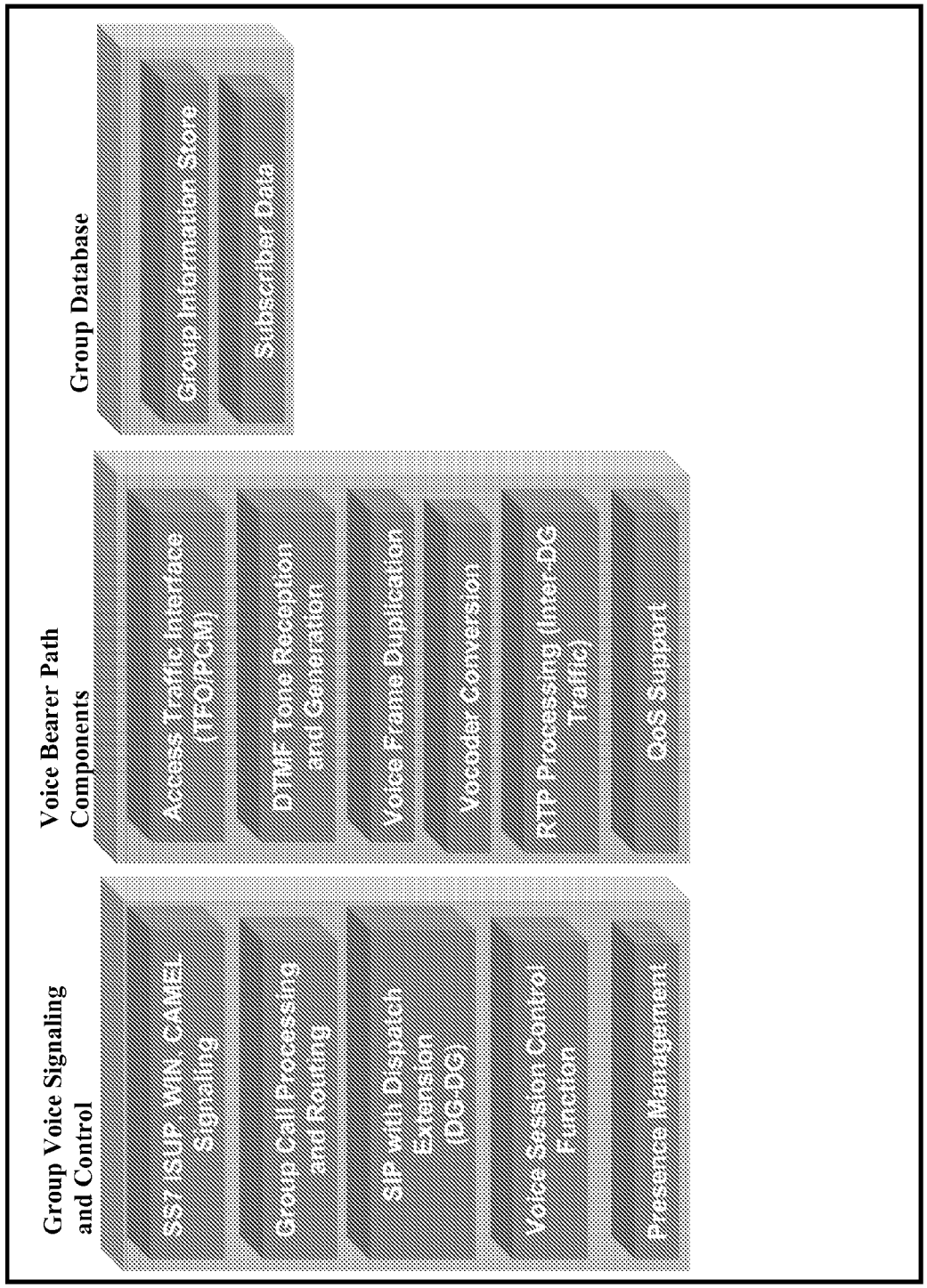
FIG. 5 is a block diagram that illustrates the major functional blocks in the dispatch gateway according to a preferred embodiment of the present invention.

FIG. 5 is a block diagram that illustrates the major functional blocks in the DG 102 according to a preferred embodiment of the present invention.

1. Group Voice Signaling and Control—This subsystem is involved in the control plane for processing group call requests, communicating with the MSC 104 or PSTN 106, controlling its own bearer path ports and handling presence notifications. It consists of following important modules SS7 ISUP, WIN, CAMEL Signaling—This module is responsible for handling all ISUP messages and maintaining ISUP related call state machines. It routinely monitors the health of TDM circuits and initiates/terminates ISUP maintenance requests. It interfaces with group call processing layer to originate or terminate call requests. The WIN/CAMEL interfaces are used by the MSC 104 to notify the DG 102 about the dialed digits (group id) when an origination trigger condition is met. In this way, the DG 102 can start setting up the terminating legs parallel to the originating leg radio setup. This gives faster group call setup.

Group Call Processing and Routing—This module processes group call requests, maintains call state machines for each originating and terminating call leg, and routes call according to the called MS-ISDN numbers. It also interfaces with a group and subscriber database for retrieving group and subscriber related information, and validating the subscribers' authenticity. It also controls the floor of the group call by allowing only one user to speak at any time during the call session. A Routing function decides whether the call needs to be terminated to the MSC 104, PSTN 106 or IP network 124 (Inter DG call to bypass toll).

SIP with Dispatch Extension (DG-DG)—This module enables two DGs 102 to communicate with each other at signaling plane. Two DGs 102 may communicate to establish a call in a toll bypass mode or to retrieve group information for a group from its home DG 102. They may also exchange signaling messages during a call session to indicate call continuation or call re-initiation requests. Standard SIP message set may need to be modified to suit these inter-DG group call control features.

Voice Session Control Function—This module acts as a media control agent to perform incoming and outgoing port allocation, to control voice frame duplication and media switching. It is a lower layer function to control bearer paths within the system. It also interacts with bearer the path to generate and receive DTMF tones. It interfaces with a group call processing layer to send and receive call control messages.

Presence Management—This function handles group service registration requests and updates group service users with the presence information (whether fellow group subscribers are using group service) of fellow group subscribers. This application runs as a separate entity, and updates group database and sends notification to mobile nodes. It communicates with a corresponding application layer in the mobiles 120 through the IP network 124 (via the PDSN 126). This application may also use an existing SMS infrastructure to transport registration request and presence update messages from/to mobile nodes to/from the DG 102, respectively. If the SMS infrastructure is used, the SMS payload is used to carry the signaling message that contains information about the type of message received, and a set of Type/Value pairs. However, this requires the mobile units to have SMS service that can send mail outside a configured PLMN (public land mobile network).

2. Voice Bearer Path Components—This subsystem is responsible for handling voice frames in the bearer path. It also receives and generates DTMF tones and notifies the media control application. It has following major functional components Access Traffic Interface (TFO/PCM)—This module is responsible for the terminating or originating PCM/TFO interface from/to the MSC 104 or PSTN 106. It handles TFO negotiation procedures with originating and terminating BSC 112. Please note that for a TFO-TFO call (where both originating and terminating legs support TFO), this function does not modify the voice payload content In this scenario, it just accepts PCM frames from an originating port, buffers it for 20 ms, extracts signaling information (if anything is carried) and switches the payload to the terminating legs as a PCM frame (carrying TFO). However, if any of the leg does not support TFO, this function provides input to a vocoder conversion function to change the packet format to PCM for that leg. Please note that all legs of a group call will support PCM, but some of them may support TFO (since TFO requires a BSC 112 upgrade and it is assumed that service providers may not have upgraded all BSCs 112 in their network at the time of deployment of group voice service). The DG 102, by default, will try to negotiate TFO with the remote terminating BSC 112. If the remote BSC 112 doesn't respond, the DG 102 will establish a pure PCM interface.

DTMF Tone Generation and Reception—In this architecture, the group voice service application in the mobile 120 and the DG 102 exchange a set of defined in-band DTMF tones as call control events to regulate the group call. These include an initiating pause request by the originator, initiating call continuation request by a user and communicating state change requests to mobiles 120 by the DG 102. This functional component sits on the bearer path to detect DTMF tones that are originated by the group voice service application in the mobiles 120. Once detected, it notifies the media control function. Similarly, upon receiving instruction from the media control function, it generates DTMF tones to be received and analyzed by the corresponding application in the mobiles 120.

Voice Frame Duplication—In the group voice application, voice frame duplication plays a key role as incoming frames need to be copied or switched to many outgoing ports. A multicasting control technique is used whereby it reduces number of frames at the back plane for internal frame switching and at the same time minimizes number of packets to be carried to another DG 102 (over the IP network 124) that controls a set of end points of the group call.

Vocoder Conversion—A group call can involve legs where some of them do not support TFO. In that scenario, a vocoder conversion is needed at the DG 102 between TFO, which carries an EVRC format payload for CDMA, and EFR/AMR (Enhanced Full Rate/Adaptive Multi Rate) voice coding for GSM, and PCM. An alternate solution to vocoder conversion can be to support all call legs on PCM (every leg supports this as default). But, this would reduce MOS for call legs that support TFO. It is assumed that TFO will be introduced in most parts of the network by the time group service is deployed in the field.

RTP Processing (Inter-DG Traffic)—Two DGs 102 may get involved in transporting voice frames over the IP network 124. This is used to bypass the PSTN 106. In this scenario, the RTP protocol is used to carry voice frames either in the form of TFO/PCM (G.711) between two DGs 102. Only one RTP stream is used for a group call between two DGs 102. The receiving DG may internally connect that single RTP source to many access ports (TDM). Please note that while sending RTP packet, the source DG 102 does not change the voice payload format The PCM frames (carrying TFO) are buffered and packetized at 20 ms interval and sent in an RTP envelope without modifying the content. The receiving DG 102, depending on supported formats on access legs (PCM or TFO), may change the payload format.

QoS (Quality of Service) Support—The DG 102 may require the use of RSVP (Resource Reservation Protocol) or proprietary QoS protocols to indicate high priority for delivering packets carrying voice frames.

3. Group Database—This subsystem is the repository of group subscriber information. The Group call processing layer, presence application and other system provisioning components interact with this subsystem.

Group Information Store—This module stores group related information keyed against a unique group id. The group information consists of a set of subscribed members and their privileges. A group may have members located across different regions within a national network. The DG 102 that holds this information for a specific group is called the Home DG 102 for that group. If a group call request arrives at a DG 102 that does not hold the requested group information, it identifies the Home DG 102 of the group and fetches information from there. It might store that information in its cache temporarily.

Subscriber Data—This module stores information of a subscribed group user keyed against the subscriber MS-ISDN and/or internal member id. It stores the subscriber's registration information and the group ids of which he/she is a member. This information is used by the presence application to send a presence notification. Please note that the subscriber data does not include the information about his/her current location. However, it may be possible to store whether a mobile 120 is in its home network or outside by comparing the system id that it sends during group voice registration. This information may be useful in terminating a call to a user directly instead of going to its home network.

Group Voice and Presence Application

Figure 6:
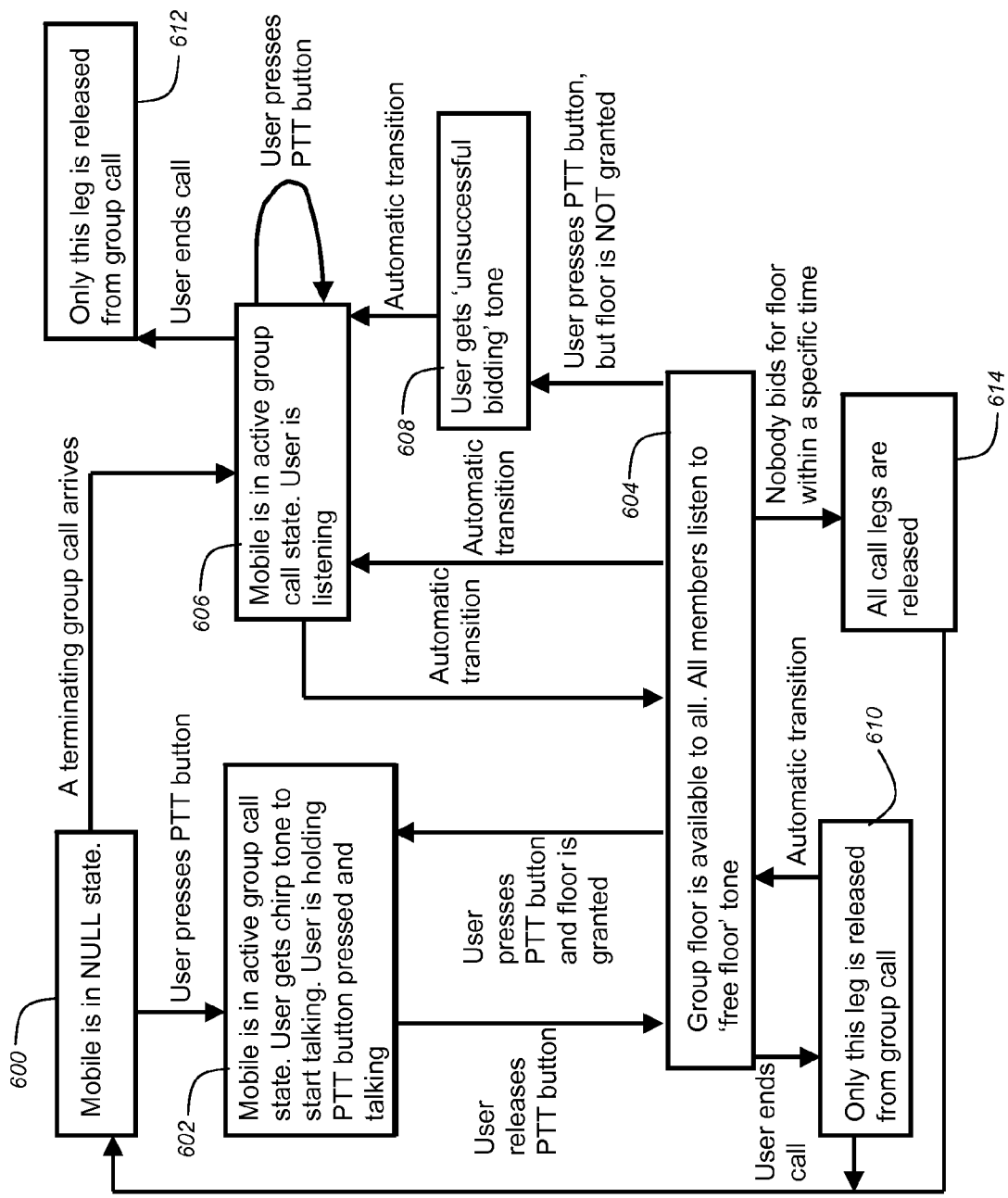
FIG. 6 is a state diagram that illustrates the functions of the group voice application according to a preferred embodiment of the present invention.

FIG. 6 is a state diagram that illustrates the functions of the group voice application according to a preferred embodiment of the present invention.

State 600 represents a mobile 120 in a NULL state, i.e., the start of the logic. A user pressing a PTT button or making a request to terminate a group call triggers a group voice application.

State 602 represents a mobile 120 in an active group call state: In this state, the user receives a chirp tone to start talking. The user responds by pressing the PTT button on the mobile 120 and talking. A talking user must hold the PTT button. The group voice application in the mobile 120 ensures that only when the user presses the PTT button is the reverse traffic channel is used to send voice frames, and the DG 102 switches voice frames only in one direction, i.e., from talker to listener, which ensures the half-duplex operation required for a PTT call.

State 604 represents the group "floor" being available to all members of the group. When the talking user releases the PTT button, the floor is available to all group members. All members of the group receive a "free floor" tone on their mobile 120. A user who requests the floor by pressing the PTT button first (in the "free-floor" state) is assigned the floor, wherein the network sends a chirp tone to the successful user.

State 606 represents a mobile 120 being in an active group call state. In this state, the user is listening to the group call. If a non-taking user presses the PTT button in a call active state, the user does not receive any response from the network and remains in the same functional state.

State 608 represents a user receiving an "unsuccessful bidding" tone on his mobile 120, after the user pressed the PTT button, but was not granted the floor of the group call. The user subsequently starts listening to the voice message of the talking user.

Non-talking users (including the talking user who must release the PTT button to end the call thus becoming non-talking and making the floor available for others) can request the network to end their respective call legs explicitly.

State 610 represents a terminating leg being released from the group call after the user ends the call.

State 612 also represents a terminating leg being released from the group call after the user ends the call.

State 614 represents all terminating legs being released from the group call when no member of the group bids for the floor within a specified time period.

Service Interactions

A mobile 120 can support either cellular or group voice service at any instant of time. This section highlights various scenarios when two services are crossing paths with each other. In some of these cases, the users' intervention is needed to select one of the services, whereas other cases are decided by the application itself as part of call processing logic. This section also discusses the impact of other cellular services such as call hold, call forwarding, call forwarding busy, call waiting, call forwarding no answer, etc., on group voice service.

The following table is prepared on the basic assumption that, while using the group voice service, a user cannot put other parties on hold, even though he can switch to another call without disconnecting his group call session. However, a user can leave the group call session at any time by selecting an "end" key. The objective is to allow group members to continue with the call while one or more legs can either be released from the DG 102 or disjoined at the MSC 104 (at the time of service switching) during a session. The network releases a group call only when a floor remains free for a predefined time. If a talking user leaves the session, the network will make the floor available to all others.

It is also assumed that a group user has call waiting, calling number presentation at call waiting, call forwarding busy (to voicemail) and calling line identity presentation features.

TABLE 1

Service Interaction Scenarios for Group Voice Application

| SI (Service Interaction) No. | Present State (in Mobile) | Triggering Event | Action by Group Voice and Presence Application in Mobile Handset | Remarks |
| --- | --- | --- | --- | --- |
| 1. | A group voice call is in active state and the user is talking with the PTT button pressed. | Another group or cellular call is being terminated by the MSC and a call-waiting tone is played. The user is prompted to accept the second call. The following scenarios can happen: (1) he releases the PTT button and accepts the second call; (2) he releases the PTT button, ends the active call and accepts the second call; (3) he does not accept the waiting call and continues with the first call. | (1) In this case, the application sends a DTMF signal to free the floor. Next, the application sends a FlashwithInfo message to accept the second call, while the first call is broken at the MSC. After attending the second call, the user may toggle to first one. (2) In this case, application sends a DTMF signal to free the floor. Next it releases the active call and the second call is established as defined in procedure 2.5.5.2 of 3GPP2 A.S0001-A, Nov. 30, 2000. (3) The MSC provides treatment to the second call as a 'call forwarding no answer' feature provisioned for the user. | For the first case, the user is alive as the non-talking leg to DG, even though the circuit is broken at the MSC. The DG may release all legs of the call at any time. |

TABLE 1-continued

Service Interaction Scenarios for Group Voice Application

| SI (Service Interaction) No. | Present State (in Mobile) | Triggering Event | Action by Group Voice and Presence Application in Mobile Handset | Remarks |
| --- | --- | --- | --- | --- |
| 2. | A group voice call is in the active state and the user is non-talking (does not hold the PTT button pressed). | Another group or cellular call is being terminated by the MSC and a call-waiting tone is played. The User is prompted to accept the second call. The following scenarios can happen: (1) he accepts the second call; (2) he ends the active call and accepts the second call; (3) he does not accept the waiting call and continues with the first call. | (1) In this case, the application sends a FlashwithInfo message to accept the second call, while the first call is broken at the MSC. After attending the second call, the user may toggle to the first one. (2) In this case, the application releases the active call and the second call is established as defined in procedure 2.5.5.2 of 3GPP2 A.S0001-A, Nov. 30, 2000. (3) The MSC provides treatment to the second call as a 'call forwarding no answer' feature provisioned for the user. | |
| 3. | A cellular voice call is in active state. | Another group call is being terminated by the MSC and a call-waiting tone is played. The User's action is similar to the previous case. | Similar to the previous case. | |
| 4. | A group call is in the active state and the user is talking with the PTT button pressed. | The User wants to originate another cellular call. The following scenarios may happen: (1) The User releases PTT button and originates the second call; (2) the User releases the PTT button, ends the first active call and originates the second call (he can originate a group call also). | (1) In this case, the application sends a DTMF signal to free the floor. Next, the application sends a FlashwithInfo message to originate the second cellular call, while the first call is broken at the MSC. After attending the second call, the user may toggle to the first one. (2) In this case, application sends a DTMF signal to free the floor. Next, it releases the active call and then originates a cellular or group | In the first case, it may lead to a 3-party call. The 3-party call should be avoided from the group call perspective. |

TABLE 1-continued

Service Interaction Scenarios for Group Voice Application

| SI (Service Interaction) No. | Present State (in Mobile) | Triggering Event | Action by Group Voice and Presence Application in Mobile Handset | Remarks |
|---|---|---|---|---|
| 5. | A group call is in the active state with the non-talking user, (the PTT button is free). | The user wants to originate another cellular call. The following scenario may happen: (1) the user originates second cellular call; (2) the user ends first active call and originates second call (he can originate group call also). | call (by pressing the PTT button). (1) In this case, the application sends a FlashwithInfo message to originate the second cellular call, while the first call is broken at the MSC. After attending the second call, the user may toggle to the first one. (2) In this case, the application releases the active call and then originates a cellular or group call (by pressing the PTT button). | |
| 6. | A cellular voice call is the active state. | The user wants to originate a PTT call. The following scenarios may happen: (1) the user originates the second (PTT) call by pressing the PTT button; (2) the user ends the first active call and originates the second call (PTT). | (1) In this case, the application sends a FlashwithInfo message to originate the second PTT call while the first call is broken at the MSC. After attending the second call, the user may toggle to the first one. (2) In this case, the application releases the active call and then originates a group call (by pressing the PTT button). | |
| 7. | A group/private call is active and the user is talking/non-talking. | Data session termination or origination. | The network (MSC/BSC) may or may not support the concurrent services. If the network supports as per the IOS specification, it aims at providing concurrent services for one voice and one 3G data session simultaneously. With respect to concurrent PTT service and data sessions, the DG is transparent because the PTT service is | |

TABLE 1-continued

Service Interaction Scenarios for Group Voice Application

| SI (Service Interaction) No. | Present State (in Mobile) | Triggering Event | Action by Group Voice and Presence Application in Mobile Handset | Remarks |
| --- | --- | --- | --- | --- |
| | | | handled like a voice call by the network/mobile. | |

Advanced Services

The dispatch solution architecture can be useful to build advanced services in addition to the basic dispatch service framework. Examples of those kinds of services are:

1. Push to Talk from IP Terminals

Push to Talk service using PTT clients on PDAs, laptops, desktops

Eliminates vocoder conversion and saves RF radio channels

2. Closed Group Text Messaging

A method of using text messaging for closed user group

3. Instant Push to Talk Call Upgrade

Private Call Push to Talk call⇔Full Duplex calls—on demand

Group Push to Talk call⇔Instant Full Duplex conferencing—on demand

4. Push to Talk message recording & playback

An efficient method of recording a copy of Push to Talk messages for set of subscribers A method of delivering and displaying the recorded Push to Talk messages 5. Location pin point A method to identify and distribute location of all my group members 6. Nearest group member A method to figure out the order list of nearest group members 7. Group/Private Voice SMS A method of delivering and storing voice SMS applied for a private/group basis 8. Inter Carrier Push to Talk Service A method of allowing Push to Talk service across CDMA, GSM, WCDMA & TDMA subscribers.

A method of allowing creation of dynamic group membership across different carriers.

Call Flow for a Voice Group Call—CDMA

Figure 7:
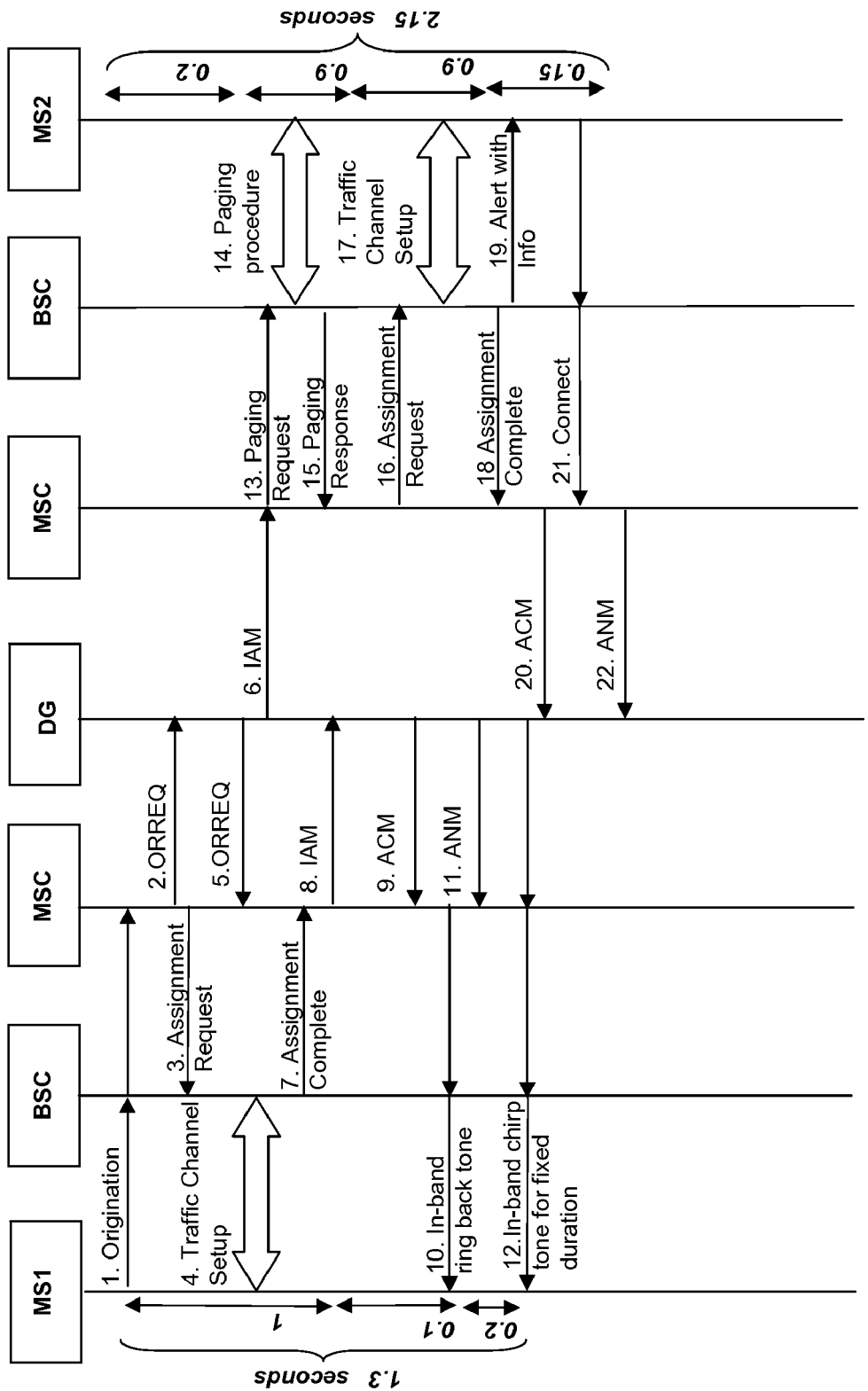
FIG. 7 is a block diagram that illustrates the call flow for a Voice Group Call in a CDMA network according to a preferred embodiment of the present invention.

FIG. 7 is a diagram that illustrates the call flow for a Voice Group Call in a CDMA network according to a preferred embodiment of the present invention.

1. The first Mobile Station (MS1) originates a group call by dialing a Detection Point trigger code and group ID. Upon receiving the MS1's request for an origination, the BSC formats and sends a CM (Connection Management) Service Request message to the MSC, prompting the MSC to begin setting up the call to the DG. The called party IF (Information Element) contains both the Detection Point trigger code and group ID. It is assumed that the originating DG is also the group's Home DG.

2. Upon receiving the CM Service Request message, the MSC analyzes the dialed digits and determines that the trigger code in the called party IE meets the origination trigger criteria. On satisfying the origination trigger criteria, an ORREQ (Origination Request) message is sent to the DG. The ORREQ contains the dialed digits.

3. The MSC begins allocating terrestrial resources required for the call between the BSC and the MSC, and sends CIC (Circuit Identity Code) information in an Assignment request to the BSC.

4. The BSC initiates the radio channel allocation procedure.

5. Meanwhile, the DG analyzes the dialed digits and identifies the group id. It responds to the MSC with an ORREQ message, which contains the routing number to the DG so that the MSC can terminate this group call to the DG.

6. The DG gets the group id from the dialed digits received in the ORREQ message. It obtains member information including a Mobile Directory Number (MDN) from the group database and begins setting up terminating legs. Based on the MDN, it sends an IAM (Initial Address Message) message to the MSC. The terminating legs are set-up in parallel with originating leg set-up to speed up the call set-up time.

7. Subsequent to the MS1 acquiring the traffic channel the BSC sends an Assignment Complete message to the MSC.

8. The MSC begins to route the call based on routing info (TERMLIST) received from the DG in the ORREQ message. The MSC sends an IAM message to the DG.

9. The DG after receiving the IAM, immediately responds to the MSC with an ACM (address Complete Message), and subsequently ANM (Answer Message) with no delay between them 10. The MSC plays an in-band ring back tone after receiving the ACM.

11. The ANM is received by the MSC and it stops the ring back tone.

12. Now, the DG generates an in-band chirp tone to notify the originator to start talking. This tone is played for a specific duration (200 msec) after which the originator starts talking.

13. The MSC sends a paging request to the BSC in order to locate the second Mobile Station (MS2).

14. The BSC does the paging procedure for MS2

15. Once a paging response is obtained from MS2, the BSC gives a paging response to the MSC.

16. The MSC allocates a terrestrial circuit between the MSC and BSC, and sends the information to the BSC in an Assignment Request. The Assignment Request message also contains the calling party number with its group ID and signal IE for the alerting MS2.

17. The BSC performs a traffic channel setup procedure for MS2.

18. Subsequent to completion of the traffic channel setup, the BSC sends an Assignment Complete message to the MSC.

19. The BSC sends an Alert With Info message to MS2 to start alerting. This message has the calling party number, which contains the group ID. MS2 understands from this group ID that the call is a PTT and ignores signal IE in this message.

20. The MSC sends an ACM to the DG after receiving an Assignment Complete message from the BSC, indicating that MS2 is alerting.

21. The dispatch application at MS2 (without waiting for user response) sends a connect message to the BSC/MSC if the dispatch service does not require the user to press any key on the mobile to accept the dispatch call. This provides instant connectivity between the originating and terminating mobiles.

22. The MSC sends an ANM message to the DG and the DG completes the one-way voice path from the originating mobile to the terminating mobile.

Call Flow for a Voice Group Call—GSM

Figure 8:
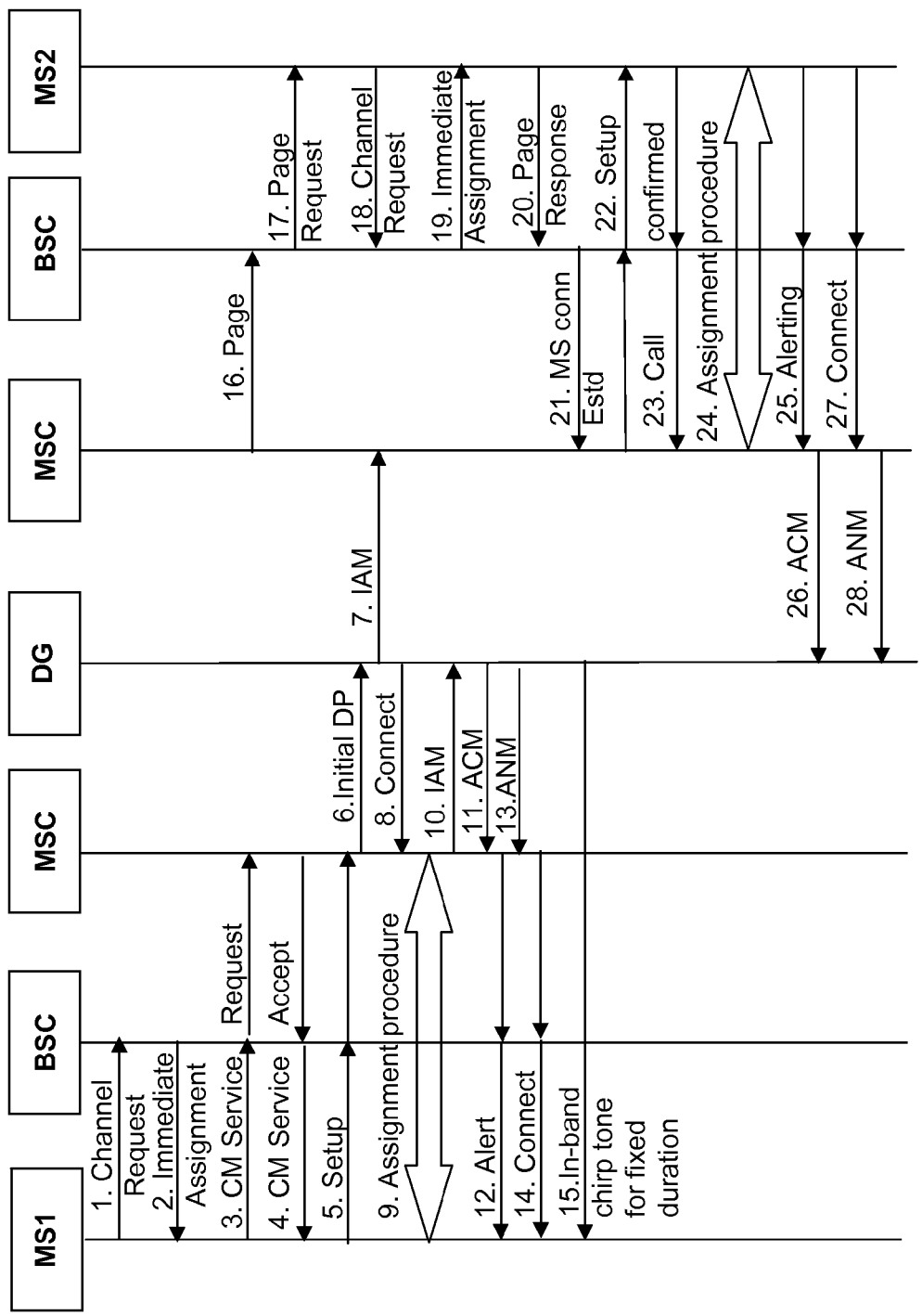
FIG. 8 is a block diagram that illustrates the call flow for a Voice Group Call in a GSM network according to a preferred embodiment of the present invention.

FIG. 8 is a diagram that illustrates the call flow for a Voice Group Call in a GSM network according to a preferred embodiment of the present invention.

1. MS1 requests an assignment of a dedicated signaling channel for call origination.

2. A dedicated signaling channel is assigned and intimated to the MS1.

3. A CM Service Request is send to the MSC to initiate a call setup procedure. Upon receiving the CM Service Request, the MSC may delay the authentication in order to speed up the call setup.

4. The MSC sends a CM Service Accept to MS1 in order to proceed with call setup. In this case, authentication may be initiated by the MSC at a later time.

5. MS1 sends a setup message with the dialed digits. The dialed digits contain the access code for the group call and the group ID.

6. Because the origination trigger criteria is met as per the subscriber's profile for PTT service, the MSC originates an Initial DP (Detection Point) Request to the DG for further service interaction.

7. After receiving the Initial DP Request from the MSC, the DG looks into its database of group information in order to obtain directory numbers of group members belonging to the group ID specified in the message. For each member of the group, the DG originates an IAM and sends it to the MSC with a directory number as the called party number. The DG also sends CIC information for each terminating leg to the MSC.

8. The GSM SCF (Service Control Function) instructs the MSC to connect to the DG by specifying a redirection number.

9. The MSC triggers the assignment procedure for allocating terrestrial resources between the BSC and MSC and radio resources for MS1. MS1 is notified about the allocated channel for this call.

10. The MSC begins routing the call based on the redirection number received from the GSM SCF. The MSC terminates the call to the DG by sending an IAM.

11. The DG, after receiving the IAM, immediately responds to the MSC with an ACM, and subsequently, an ANM with no delay between them.

12. The MSC sends an Alert to MS1 to trigger alerting at MS1.

13. The DG sends an ANM to the MSC.

14. The MSC sends a connect to MS1, which stops the alerting tone at MS1.

15. Now, the DG generates an in-band chirp tone to notify the user to start talking. This tone is played for specific duration after which the originator start talk.

16. The MSC send a paging request to the BSC to locate MS2.

17. The BSC performs a paging procedure to locate MS2.

18. MS2 requests a dedicated signaling channel

19. A dedicated signaling channel is assigned and intimated to MS2.

20. MS2 sends a paging response through the dedicated signaling channel.

21. When the BSC receives the paging response from MS2, it sends an MS Conn Estd (Mobile Station Connection Established) message to the MSC.

22. The MSC sends a Setup message to MS2 with information such as the called party number and group ID.

23. MS2 responds with a Call Confirmed message to the MSC.

24. The MSC performs an assignment procedure to allocate terrestrial and radio resources.

25. After successful allocation of all resources, MS2 sends an Alerting message to the MSC to indicate that it is alerting.

26. The MSC sends an ACM to the DG confirming the alerting of the terminating mobile.

27. The dispatch application at MS2 (without waiting for user response) sends a Connect message to the MSC if the dispatch service does not require the user to press any key on the mobile to accept the dispatch call. This provides instant connectivity between the originating and terminating mobiles.

28. The MSC sends an ANM message to the DG and the DG completes the one-way voice path from the originating mobile to terminating mobile.

Architectural Benefits

A number of benefits are derived from the architecture of the present invention, including, but not limited to:

1. No Change in the Network Required—The biggest advantage of this architecture is that group voice services can be introduced into a carrier's existing network without requiring any changes to already installed network equipment This just acts as an add-on facility to the carrier. Of course, mobiles 120 require some upgrades to support this service.

2. Independent of Radio Access Technology—This architectural solution sits behind the MSC 104 and interfaces with the MSC 102, through SS7 and TDM interfaces. Hence, it is independent of the radio access technology of service provider's network. As a result, this solution can be easily extended to GSM, CDMA, TDMA and future 3G access networks. In fact, this solution will even work with a normal wire line interface (as it supports TDM), thus making it capable of integrating wire line and wireless group voice services at a central node.

3. Independent of air interface—this approach does not mandate deployment of 1xRTT, as it can work well with CDMA One. Carriers need not accelerate capital spending on 1xRIT for PTT service.

4. Superior voice quality—This architecture supports TFO so that vocoder conversion is avoided, thus increasing MOS for mobile-to-mobile calls. Also, it uses full rate EVRC.

5. Faster Call Setup—This architecture ensures faster complete call setup time by using WIN/ANSI triggers to set up the terminating legs parallel to originating side setup. The group voice application for terminating handsets avoids unnecessary "alerting" to the user and does not wait for the user to "connect". Instead, it plays a short duration tone while sending a "connect" automatically to the network. This saves usage of radio resources and makes it much mote economical than a cellular call.

6. Intelligent Voice Buffering for Originating Leg—This architecture allows the PTT originating party to start talking earlier than when actual end-to-end call setup is done. The originating party's voice is buffered at the DG 102 until at least one of the terminating legs answers the call This way, the originating party need not hold the PTT button unnecessarily until the terminating leg connects. Also, voice buffeting starts only when a DSP (Digital Signal Processing) component detects voice samples on an incoming line. This reduces overall buffer space requirements inside the DSP (since an initial silence period between "listening chirp tone and start talking" is not buffered).

7. Call Support for Selective Members Within Group—This architecture supports setting up calls for selective members within a group. The PTT client sends a list index for a group and the PTT server terminates to listed members.

8. Mechanism of Setting Groups from Mobile Handset—This architecture allows the setting up of groups dynamically from mobiles 120. A user with sufficient privileges can configure groups and add/delete/modify other members. This architecture uses the SMS or IP transport to exchange messages between the PTT client and server.

9. Seamless Service Interactions: The service interaction between cellular and dispatch is handled seamless by inherent nature of this architecture.

10. Roaming across service providers: A mobile 120 can roam into different service providers and still avail itself of the PTT service. The visiting MSC 104 downloads the profile from the HLR 126, when the roaming mobile 120 registers in the MSC 104. The profile contains the WIN triggers and DG 102 address for the PTT service. When the trigger criterion is met, the visiting MSC 104 contacts the DG 102 at its home network. The DG 102 provides the MSC 104 with the redirection number to route the call to the DG 102 in the home network. The DG 102 further sets up the PTT call. This eliminates the need for the DG 102 at the visiting network. Also, the mobile 120 can receive a group/private call when roaming in different networks.

11. Eliminates long distance "tromboning" effect: Tromboning refers to the setting up of a call from the serving system of a calling party to the home system of called party and then back to the serving system, when the called party is roaming in the serving system. If the serving system is capable of querying the HLR 126 for routing information of the terminating mobile, it can eliminate tromboning. The DG 102 is capable of querying the HLR 126 using IS41. When a mobile 120 roams outside his home network (SID/NBD), the DG 102 queries the HLR 126 for its location and sets up the call towards a DG 102 pertaining to the serving MSC 104 and thus eliminates tromboning.

12. Presence Application Integration—This architecture integrates the presence and group voice service application efficiently. Presence information is useful to place call selectively to a user knowing that he/she is available in the network 13. Wide Area Group Call Support—This architecture supports group voice service across regional and national boundaries. With packet network infrastructure at the core, long distance calls can avoid a PSTN tariff.

14. Evolution path to all IP mobile wireless communication—By already implementing IP at the core, this architecture provides an evolutionary path for the operator to a future all-IP infrastructure. Even though all-IP mobile wireless is still in nascent stages for voice communication, this dispatch solution can be reused with minimal changes in the future for integration with a soft-switch.

15. Ubiquity of IP platforms at control and bearer plane—Since this architecture uses IP based platforms for signaling and voice traffic between DGs 102, any IP based device with a dispatch client can utilize the dispatch services and reach the wireless group users and vice versa. This provides a true convergence of instant messaging services between wire-line and wireless users. Also, IP based dispatch platforms can be integrated easily with already existing instant messaging and presence servers within the Internet.

16. PTT support for landline—Since the DG 102 is connected to the PSTN/106 network, it can very easily support landline subscribers as part of a dispatch group. The landline users can originate and terminate a PTT call.

17. Usage of multicasting reduces number of voice packets in the network—By using dynamic multicasting for a group call, the number of (bearer) packets flowing in the backbone intranet can be reduced significantly for inter-DG dispatch calls. This architecture proposes a multicast based approach for the members who are in within the subnet (but across the DG 102). In this way, the number of packets flowing on the bearer plane in the IP network 124 can be drastically reduced within the subnet However, for a member of a group call outside the subnet, it is intended to use unicast, since router updates may take a significant amount of signaling time for setting up a dynamic group call.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The invention claimed is:

1. A dispatch service apparatus for providing group voice services in a cellular telephone network, comprising:
    a cellular telephone network for making calls between mobiles, wherein the calls are initiated by call setup and in-band signaling within the cellular telephone network and voice frames for the calls are switched between the mobiles by at least one mobile switching center across bearer paths in the cellular telephone network; and
    a dispatch gateway that interfaces to at least one mobile switching center in the cellular telephone network to provide group voice services therein, without requiring any changes to the mobile switching center or other equipment of the cellular telephone network to provide the group voice services,
    wherein the dispatch gateway is independent of the cellular telephone network's radio access technology,
    the group voice services provide instant two-way half-duplex voice messaging within a group of users of the cellular telephone network,
    both the dispatch gateway and the mobiles that use the group voice services communicate with each other using the call setup and in-band signaling within the cellular telephone network,
    such that at least one mobile switching center routes an originating leg of the group voice services from an originating mobile to the dispatch gateway,
    the dispatch gateway initiates one or more terminating legs of the group voice services to one or more terminating mobiles through at least one mobile switching center, and
    the dispatch gateway switches the voice frames for the group voice services from the originating mobile to the terminating mobiles across the bearer paths and through at least one mobile switching center that switches the voice frames for both the calls and the group voice services in the cellular telephone network, and wherein the dispatch gateway provides a registration and presence application that enables members of a group to track their fellow members' presence in the cellular telephone network on their mobiles, such that when a member powers on or off their mobile, the presence of the member is updated in their fellow members' mobiles.

2. The dispatch service apparatus of claim 1, wherein the dispatch gateway handles registration requests and updates group members with presence information for fellow group members.

3. A dispatch service apparatus of claim 1 for providing group voice services in a cellular telephone network, comprising:

a cellular telephone network for making calls between mobiles, wherein the calls are initiated by call setup and in-band signaling within the cellular telephone network and voice frames for the calls are switched between the mobiles by at least one mobile switching center across bearer paths in the cellular telephone network; and a dispatch gateway that interfaces to at least one mobile switching center in the cellular telephone network to provide group voice services therein, without requiring any changes to the mobile switching center or other equipment of the cellular telephone network to provide the group voice services, wherein the dispatch gateway is independent of the cellular telephone network's radio access technology, the group voice services provide instant two-way half-duplex voice messaging within a group of users of the cellular telephone network, both the dispatch gateway and the mobiles that use the group voice services communicate with each other using the call setup and in-band signaling within the cellular telephone network, such that at least one mobile switching center routes an originating leg of the group voice services from an originating mobile to the dispatch gateway, the dispatch gateway initiates one or more terminating legs of the group voice services to one or more terminating mobiles through at least one mobile switching center, and the dispatch gateway switches the voice frames for the group voice services from the originating mobile to the terminating mobiles across the bearer paths and through at least one mobile switching center that switches the voice frames for both the calls and the group voice services in the cellular telephone network, and wherein the originating mobile originates the voice group services by dialing digits that include a group ID, and the mobile switching center notifies the dispatch gateway that the dialed digits satisfy an origination trigger condition for the group voice services, so that the dispatch gateway can set up the terminating legs in parallel to the set up of the originating leg, thereby providing a faster group voice services setup.

4. The dispatch service apparatus of claim 3, wherein the group voice services comprises a Push To Talk (PTT) service.

5. The dispatch service apparatus of claim 3, wherein the dispatch gateway interfaces with a group and subscriber database for retrieving group and subscriber related information, and for validating members' authenticity.

6. The dispatch service apparatus of claim 5, wherein the group related information is stored in the group database associated with a unique group id.

7. The dispatch service apparatus of claim 5, wherein the group related information comprises a set of subscribed members and their privileges.

8. The dispatch service apparatus of claim 5, wherein subscriber related information is stored in the subscriber database associated with a mobile identifier or member id.

9. The dispatch service apparatus of claim 5, wherein the group and subscriber database is distributed across multiple dispatch gateways to support nationwide group voice services.

10. The dispatch service apparatus of claim 3, wherein the dispatch gateway performs call setup for selected members within a group.

11. The dispatch service apparatus of claim 3, wherein the dispatch gateway performs call setup on the terminating legs in parallel with a call setup for the originating leg.

12. The dispatch service apparatus of claim 3, wherein the dispatch gateway performs intelligent voice buffering for the originating leg of a group call.

13. The dispatch service apparatus of claim 3, wherein the dispatch gateway provides voice frame duplication for a group call.

14. The dispatch service apparatus of claim 3, wherein the dispatch gateway performs dynamic multicasting of voice frames for a group call involving multiple dispatch gateways.

15. The dispatch service apparatus of claim 3, wherein the dispatch gateway performs vocoder conversion on one or more legs of a group call.

16. The dispatch service apparatus of claim 3 wherein the dispatch gateway communicates with other dispatch gateways.

17. The dispatch service apparatus of claim 16, wherein the dispatch gateways support group voice services across network, regional and national boundaries.

18. The dispatch service apparatus of claim 3, wherein the mobile includes a dispatch application.

19. The dispatch service apparatus of claim 3, wherein the mobile can administer dispatch services provided by the dispatch gateway.

20. The dispatch service apparatus of claim 3, wherein the mobile can roam across a plurality of networks and still participate in the group voice services.

21. The dispatch service apparatus of claim 3, wherein the dispatch gateway performs optimal routing to terminate group voice calls for subscribers roaming outside of their home networks.

22. A dispatch service apparatus for providing group voice services in a cellular telephone network, comprising:

a cellular telephone network for making calls between mobiles, wherein the calls are initiated by call setup and in-band signaling within the cellular telephone network and voice frames for the calls are switched between the mobiles by at least one mobile switching center across bearer paths in the cellular telephone network; and a dispatch gateway that interfaces to at least one mobile switching center in the cellular telephone network to provide group voice services therein, without requiring any changes to the mobile switching center or other equipment of the cellular telephone network to provide the group voice services, wherein the dispatch gateway is independent of the cellular telephone network's radio access technology, the group voice services provide instant two-way half-duplex voice messaging within a group of users of the cellular telephone network, both the dispatch gateway and the mobiles that use the group voice services communicate with each other using the call setup and in-band signaling within the cellular telephone network, such that at least one mobile switching center routes an originating leg of the group voice services from an originating mobile to the dispatch gateway, the dispatch gateway initiates one or more terminating legs of the group voice services to one or more terminating mobiles through at least one mobile switching center, and the dispatch gateway switches the voice frames for the group voice services from the originating mobile to the terminating mobiles across the bearer paths and through at least one mobile switching center that switches the voice frames for both the calls and the group voice services in the cellular telephone network, and both the dispatch gateway and the mobiles that use the group voice services use DTMF tones for the in-band signaling within the cellular telephone network as call control events to regulate a floor for the group voice services.

23. The dispatch service apparatus of claim 22, wherein the cellular telephone network sets up a call between a mobile and the dispatch gateway, and the dispatch gateway interacts with the mobile across the network through DTMF signaling on the call.

24. The dispatch service apparatus of claim 22, wherein the dispatch gateway exchanges a set of defined in-band DTMF tones with a mobile within the cellular telephone network as call control events to regulate a group call.

25. The dispatch service apparatus of claim 22, wherein the dispatch gateway controls a floor of a group call by allowing only one member to speak at any time during a group call.

* * * * *

UNITED STATES PATENT AND TRADEMARK OFFICE
CERTIFICATE OF CORRECTION

PATENT NO. : 7,787,896 B2
APPLICATION NO. : 10/515556
DATED : August 31, 2010
INVENTOR(S) : Gorachand Kundu et al.

Page 1 of 1

It is certified that error appears in the above-identified patent and that said Letters Patent is hereby corrected as shown below:

In the Claims

Column 21, line 11, Claim 3, please delete the phrase "of claim 1".

Signed and Sealed this
Twentieth Day of May, 2014

Michelle K. Lee
*Deputy Director of the United States Patent and Trademark Office*